W. L. BLISS.
GENERATOR SUSPENSION.
APPLICATION FILED JUNE 1, 1914.
1,245,664.
Patented Nov. 6, 1917.
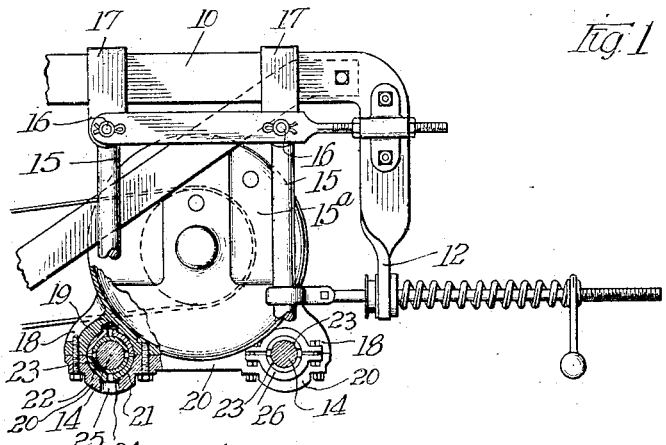
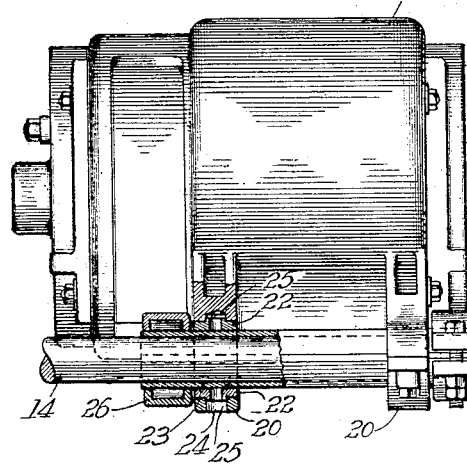
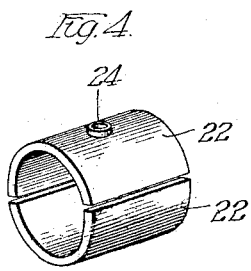
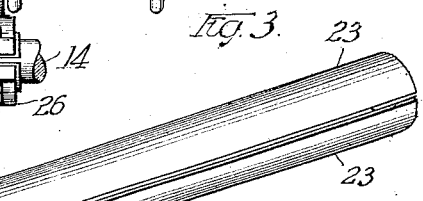
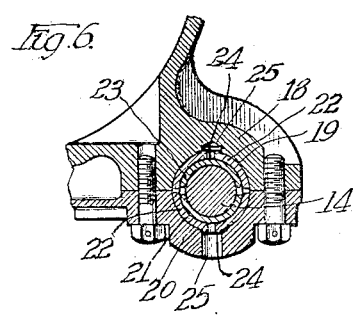
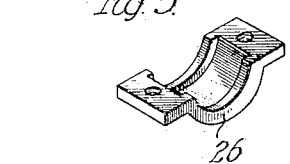
Witnesses:
Robert F. Weir
Arthur W. Carlson
Inventor
William L. Bliss
Edwin B. H. Tower Jr.
Atty

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

GENERATOR SUSPENSION.

1,245,664.  Specification of Letters Patent.  Patented Nov. 6, 1917.

Application filed June 1, 1914. Serial No. 842,092.

*To all whom it may concern:*

Be it known that I, WILLIAM L. BLISS, a citizen of the United States, residing at Niagara Falls, in the county of Niagara and State of New York, have invented new and useful Improvements in Generator Suspensions, of which the following is a full, clear, concise, and exact description, reference being had to the accompanying drawing, forming a part of this specification.

My invention relates to improvements in generator suspensions.

In many modern car-lighting systems it is customary to mount the generator on a suspension extending beyond the end of one of the car trucks. One type of generator suspension that has come into extensive use includes a pair of substantially parallel suspension bars spaced apart and projecting beyond one end of the car truck. Supported by the suspension bars are a pair of slings each having a substantially horizontal portion or cross bar on which the generator is mounted. The generator is provided with a pair of downwardly extending feet or lugs on each side which rest directly on the cross bars. Foot caps are bolted to the underside of the lugs so that each lug with its foot cap bolted in place forms a closed construction completely surrounding the cross bars. The lugs and foot caps fit loosely around the cross bars. In service the cross bars rotate slightly due to the back and forth movement of the generator.

An object of my invention is to provide improved means adapted to take up the wear incident to the movement of the generator with relation to its support.

Another object of my invention is to provide improved bushings for generator suspensions.

Another object of my invention is to provide an adjustable securing device for car-lighting generators which will effectively hold the generator against transverse displacement and at the same time secure the cross bar bushings in place.

I have illustrated one embodiment of my invention in the accompanying drawings in which:

Figure 1 is a view in elevation, partly in section, of a generator suspension showing my invention applied thereto.

Fig. 2 is a different view, partly in section, of the suspension illustrated in Fig. 1.

Figs. 3, 4 and 5 are, respectively, perspective views of the cross bar bushing, the generator lug and foot cap bushing, and the cross bar bushing clamp.

Fig. 6 is a sectional view on an enlarged scale of a portion of the construction shown in Fig. 1.

The generator suspension selected for the purpose of illustration comprises a pair of substantially parallel suspension bars 10, spaced apart and projecting beyond the end of the car truck. Each bar is provided with a downwardly extending end having a twisted extremity 12. The generator is supported on a pair of slings comprising substantially parallel cross bars 14 having their ends preferably bent upward in the form of links 15 pivoted at 16 to stirrups 17 carried by the suspension bars 10. The cross bars 14 and the links 15 constitute what may be termed a swinging cradle on which the generator 15ª having downwardly extending feet or lugs 18 is mounted. The feet 18 of the generator have a portion 19 which extends around the upper half of the cross-bars and conforms to the circular contour thereof. Bolted to the under side of the feet are continuous foot caps 20 formed with a semi-circular portion 21 at each end, adapted to fit over the lower half of the cross bars. In this way the generator is movably secured upon the cross bars.

In service the cross bars rotate slightly due to the back and forth movement of the generator, and it is desirable that the cross bars, the generator feet, and foot caps be protected from the wear occasioned thereby. This result is accomplished by providing the generator feet and foot caps with split bushings 22 and the cross-bars 14 with split bushings 23.

The bushings 22 are preferably made of pressed steel and are formed with a key or projection 24 adapted to enter suitable recesses 25, drilled into the generator feet and foot caps. In this way the bushings are securely held from turning or falling out.

The cross bar bushings 23 are of sufficient length to extend through both feet of the generator and for a considerable distance on the outside thereof. They are secured in place upon the cross-bars by adjustable clamps 26, which also serve to hold the generator against transverse displacement.

It is obvious from the foregoing disclosure that the wear incident to the rotation of the cross bars is completely taken up by the inner surface of the bushings 22 and the outer surface of the bushings 23, and injury to the cross-bars, generator feet and foot caps is effectively prevented. When the bushings become worn, they can be readily replaced and new ones substituted.

Numerous changes may be made in the form, construction and arrangement of parts without departing from the spirit of my invention or exceeding the scope of the appended claims, the form of the invention herein disclosed being merely one embodiment thereof.

What I claim as new and desire to secure by Letters Patent is:

1. Means for supporting a car-lighting generator, said means including projections from the generator casing, cross-bars adapted to support said projections, removable bushings surrounding said cross-bars, and additional removable bushings coöperating with said projections and surrounding said cross-bar bushings whereby the wear incident to supporting the generator is taken up by said bushings.

2. Means for supporting a car-lighting generator, said means including spaced projections from the generator casing, a cross-bar adapted to support a plurality of said projections, a removable bushing of a length greater than the space between said projections surrounding the cross-bar, and a removable bushing coöperating with each projection and surrounding the cross-bar bushing to take up the wear incident to supporting the generator.

3. In combination, a generator, supporting elements therefor, members on which said supporting elements rest, bushings carried by said supporting elements, and bushings carried by said members, said bushings being arranged to take up the wear incident to the movement of said elements with relation to said members.

4. Means for supporting a car lighting generator, said means including spaced projections extending from the generator casing, a cross-bar adapted to support said projections, an elongated split bushing surrounding said cross-bar, means for holding the parts of said bushing together and in place on said cross-bar, and a removable bushing coöperating with each projection, said last mentioned bushing having means for positioning the same relative to its corresponding projection, said last mentioned bushing surrounding the cross bar bushing whereby the wear incident to supporting the generator is taken up.

5. In combination, a generator, supporting elements therefor, a member on which said elements rest, a bushing carried by said member, and a bushing carried by each of said supporting elements, said last mentioned bushings being arranged to bear on the bushings carried by said member.

In witness whereof, I have hereunto subscribed my name in the presence of two witnesses.

WILLIAM L. BLISS.

Witnesses:
WM. A. TRUBAYNE,
T. H. ZELLHOEFER.

Copies of this patent may be obtained for five cents each, by addressing the "Commissioner of Patents, Washington, D. C."